Sept. 7, 1965
H. T. BLACKHURST ETAL
3,204,589
MULCHING AND SEEDING APPARATUS
Filed June 27, 1962
5 Sheets-Sheet 2
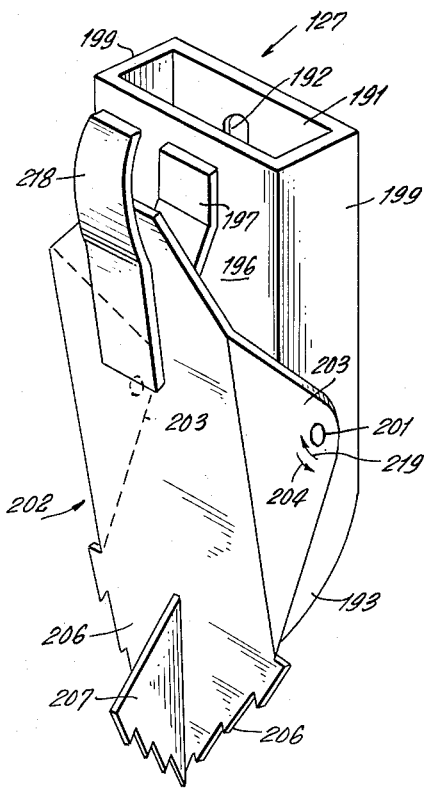
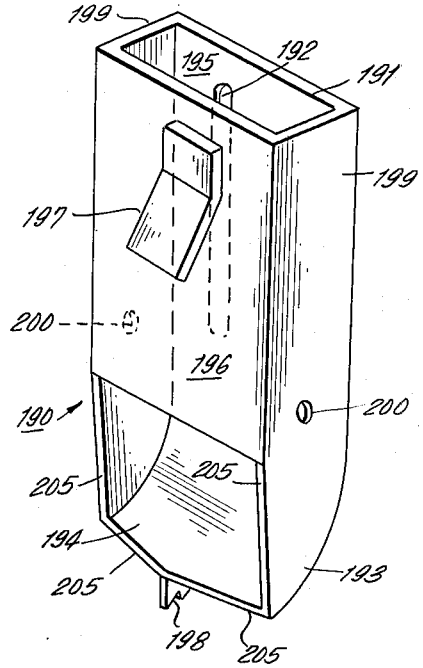
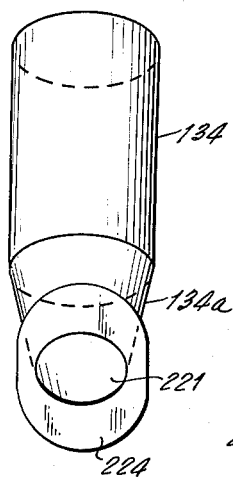
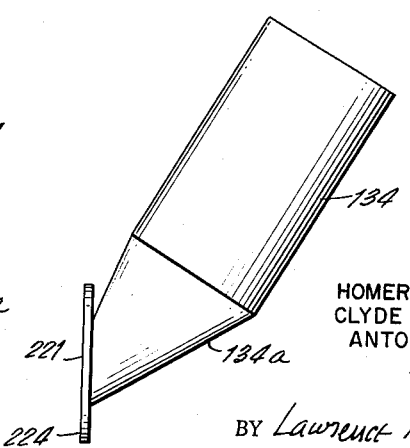
HOMER T. BLACKHURST
CLYDE C. SINGLETARY
ANTONE S. NEMEC
INVENTOR.
BY Lawrence Rosen

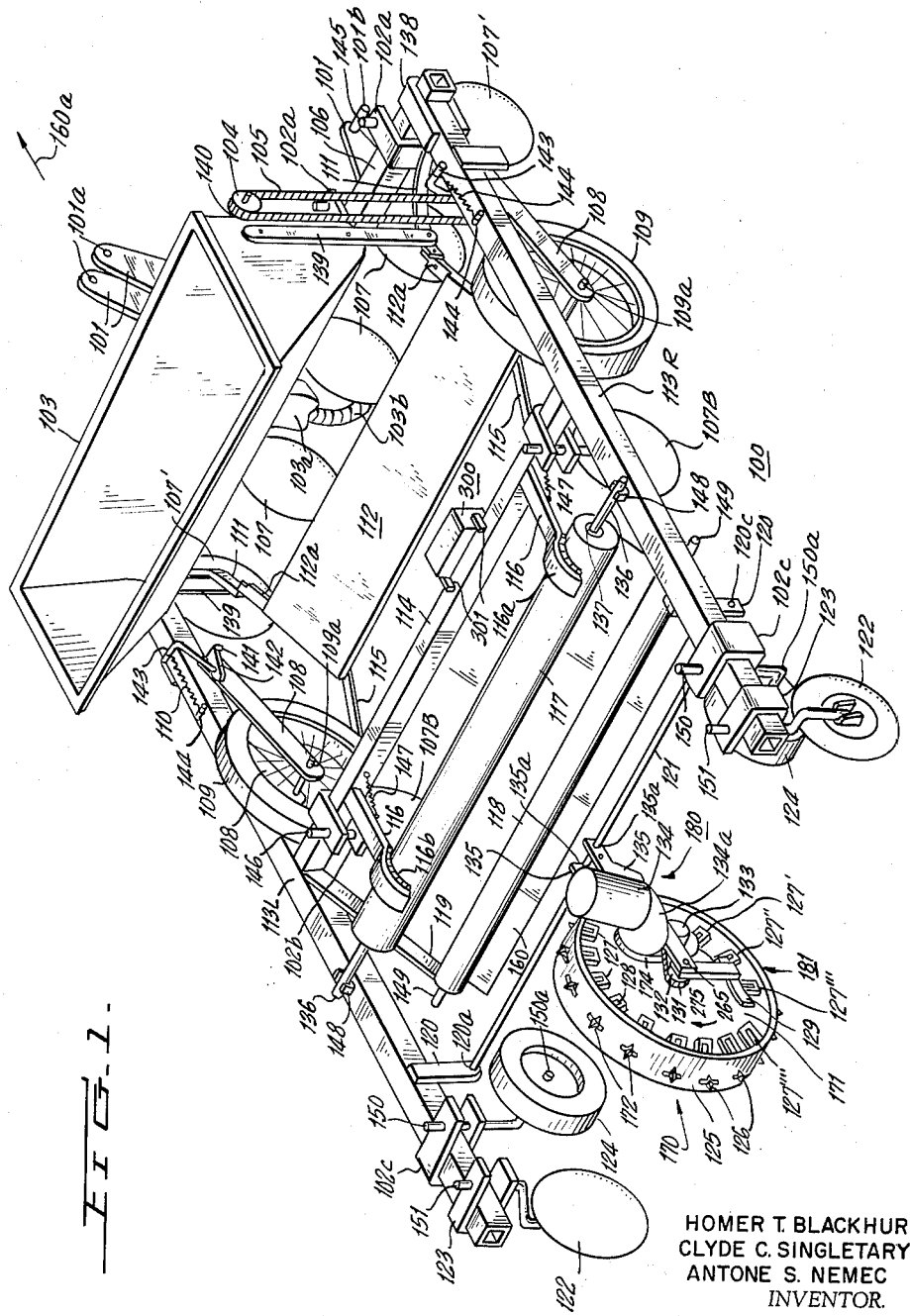

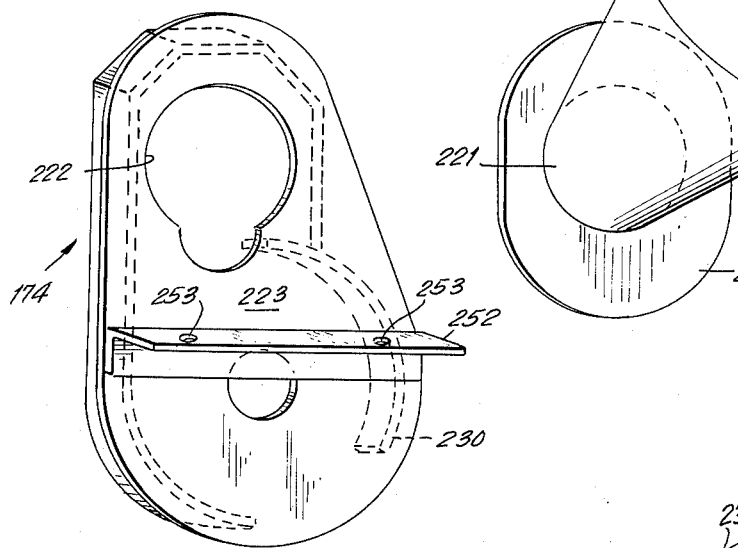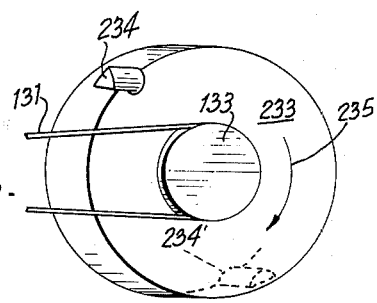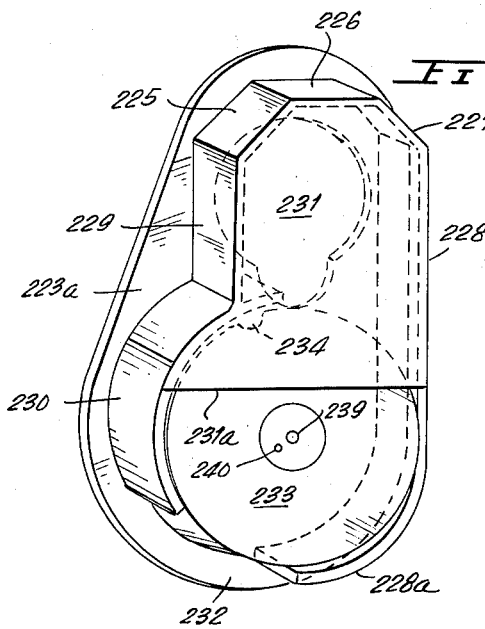

Sept. 7, 1965    H. T. BLACKHURST ET AL    3,204,589
MULCHING AND SEEDING APPARATUS
Filed June 27, 1962    5 Sheets-Sheet 4
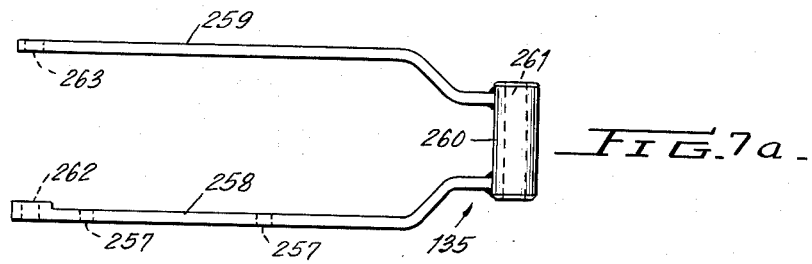
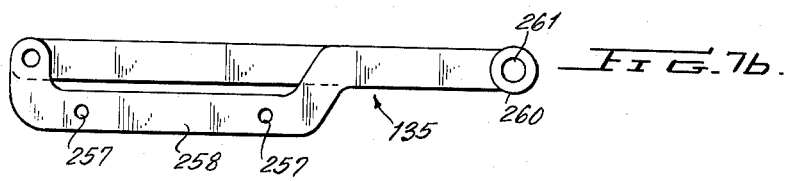
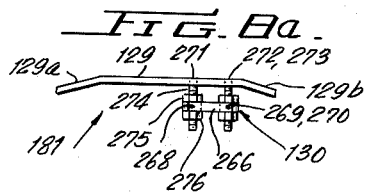
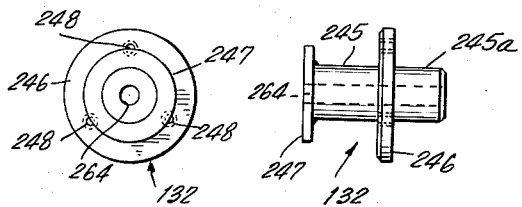
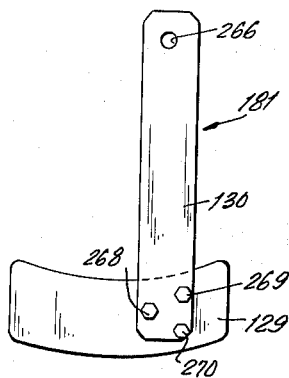
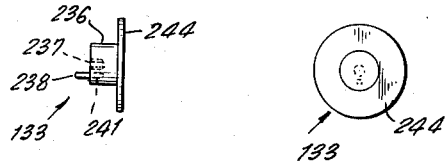
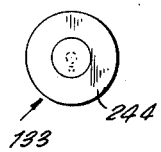
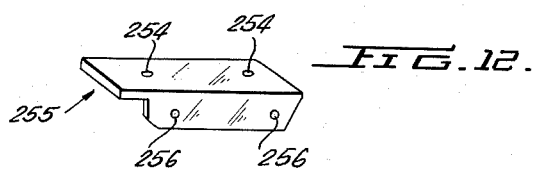
HOMER T. BLACKHURST
CLYDE C. SINGLETARY
ANTONE S. NEMEC
INVENTOR.
BY Lawrence Rosen Sept. 7, 1965 H. T. BLACKHURST ETAL 3,204,589
MULCHING AND SEEDING APPARATUS
Filed June 27, 1962 5 Sheets-Sheet 5

HOMER T. BLACKHURST
CLYDE C. SINGLETARY
ANTONE S. NEMEC
INVENTOR.

BY Lawrence Rosen

United States Patent Office 3,204,589
Patented Sept. 7, 1965

3,204,589
MULCHING AND SEEDING APPARATUS
Homer T. Blackhurst, 300 Hensel, Bryan, Tex.; Clyde C. Singletary, Box 1449, State College, Miss.; and Antone S. Nemec, Rte. 4, Box 98, Bryan, Tex.
Filed June 27, 1962, Ser. No. 205,755
6 Claims. (Cl. 111—91)

This invention relates to farm equipment and more particularly to farm apparatus for mulching and seeding in a completely automatic manner.

Mulching vegetables and other farm products with black polyethylene plastic or other coverings of the same type is a well known practice. The operation of mulching is defined as the spreading, or laying of a protective film upon tilled earth for the multple purposes of preventing the occurrence of weeds, retaining a substantial amount of moisture in the earth which is covered by the mulch or film, eliminating cultivation which destroys plant roots, and providing uniform temperature level of the earth, which factors tend to accelerate the growth, and improve quality and yield of the particular product being grown. In order to justify the cost of the mulch or film being used and the labor entailed in the mulching operation, it is necessary to provide mulching apparatus which is capable of performing the mulching operation at high speeds and with little or no attendant labor costs.

Prior art mulching apparatus has failed to provide an economically feasible system because of the slow operating speeds or failure to coordinate the mulching and seeding operations so as to produce seed deposits which are in perfect alignment with the openings in the mulch provided for the receipt of shoots as the plant begins to take nourishment and grow. The device of the instant invention permits high speed laying and perforating of the mulch together with a high speed seeding operation, while at the same time controlling these activities so that they occur in perfect synchronism with one another, thereby overcoming the faults of prior art devices.

The device of the instant invention is comprised of a frame supported by wheels and adapted to be drawn by either mechanical vehicle or an animal and is provided with fertilizer laying means, smoothing means and mulch laying means, all of said aforementioned means being operative during movement of the mulching device. Tilling means are also secured to the framework of the device in order to prepare the soil for fertilization and seeding. Furrow forming means are provided to form furrows, or channels, adjacent the sides of the mulch. Tamping means positioned behind the mulch laying means acts to urge the edges of the mulch into their adjacent furrows. Hiller discs are provided for redepositing the earth removed during the furrow forming operation upon the edges of the tamped down mulch in order to secure the mulch and prevent it from being lifted by wind. Planting means rotatably secured to the mulching device framework is provided with a plurality of seed boot assemblies positioned around the rotatable means wherein each boot assembly is adapted to receive the seeds to be planted. Automatic hopper means is positioned adjacent the rotatable means and becomes operative under control of said rotatable means to deposit seeds in each of said seed boot assembles. Cam means are provided for sequentially operating the seed boot assemblies into a dropping or seeding position substantially simultaneously with the cutting or perforating operation of each of said seed boot assemblies. The movement of the operative seed boot assemblies under control of the cam means also serves to cut the mulch to the desired amount sufficient for the receipt therethrough of a growing shoot. Further secured to the mulching device framework is a packing wheel assembly which is adapted to firm the already deposited seeds into the soil. The operation of the mulch piercing and seed dropping activities in a substantially simultaneous manner insures exact alignment therebetween so as to provide the perfect growth environment for the seeds which have been planted.

It is therefore one object of this invention to provide mulching apparatus having a novel arrangement for laying and piercing mulch and depositing seeds through seed mulch in a completely automatic manner.

Another object of this invention is to provide mulching apparatus for substantially simultaneously piercing mulch and depositing seeds through the pierced mulch in order to provide perfect alignment therebetween.

Another object of this invention is to provide a fully automatic mulching apparatus having a planting assembly adapted to pierce mulch after it has been spread under control of an associated cam means.

Still another object of this invention is to provide a seed hopper assembly having a novel arrangement for sequentially depositing seeds in a plurality of seed boots arranged in a circular array adapted to plant seeds at predetermined spaced intervals.

These and other objects will become apparent when reading the accompanying description and drawings in which:

FIGURE 1 is a perspective view of the automatic mulching apparatus.

FIGURE 2 is a perspective view of a seed boot assembly of the type employed in the mulch apparatus of FIGURE 1.

FIGURE 3 is a perspective view of the seed boot assembly of FIGURE 2 with the seed boot cap removed.

FIGURES 4a and 4b are front and rear perspective views respectively of the automatic seed hopper employed in the mulching apparatus of FIGURE 1.

FIGURE 4c is a perspective view of the seed metering wheel employed in the automatic seed feeding apparatus of FIGURES 4a and 4b wherein the seed feeding housing has been removed in order to more clearly show the metering wheel.

FIGURES 5a and 5b are front and side views respectively of the seed hopper, a portion of which is shown in FIGURE 4a.

FIGURES 6a and 6b are front and side views respectively of the planting assembly drive wheel sprocket employed in FIGURE 1.

FIGURES 7a and 7b are top and side plane views respectively of the planting assembly mounting bar of FIGURE 1.

FIGURES 8a and 8b are top and side plane views respectively of the planting assembly cam means of FIGURE 1.

FIGURES 9a and 9b are side and front views respectively of the planter wheel drive wheel shown in FIGURE 1.

FIGURE 12 is a perspective view of an angle bracket associated with the mounting bracket for the planting wheel mounting bar.

Figure 10A:
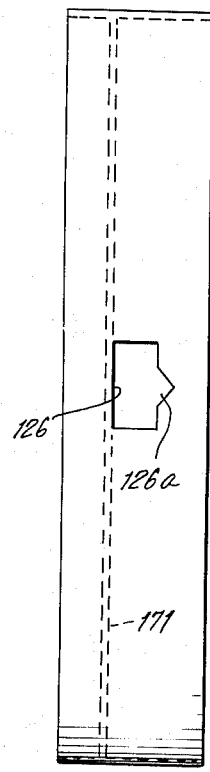
FIGURES 10a and 10b are top and side views respectively of the planter wheel assembly wheel of FIGURE 1.

Referring now to the drawings, FIGURE 1 shows the mulching apparatus 100 which is comprised of left and right-hand main frame bars 113L and 113R respectively which are secured to one another at their forward ends by means of cross bar 106 which is secured to bars 113L and 113R in any well known manner such as, for example, a C-clamp 138 shown in FIGURE 1. A second, or stabilizer bar 114 acts to properly position and space bars 113L and 113R from one another and is secured to these bars by any well known means such as, for example, by being welded thereto.

The mulching apparatus 100 may be drawn by an animal or a mechanized vehicle, by means of the members 101 which provide a 3-point hitching arrangement wherein the upper bars are each provided with apertures 101a and the lower bar is provided with a pin 101b for securement to the pulling means.

A pair of drive wheels 109 are provided for the purpose of facilitating the drawing of the mulching apparatus 100 by the drawing means such as a mechanized vehicle (not shown). Wheels 109 are mounted for rotation upon their associated axles 109a which are journalled in drive wheel bar pairs 108. The opposite end of drive wheel bar pairs 108 are pivotally mounted by means of pin 141 to the associated frame bars 113L and 113R respectively. The drive wheel bar pairs 108 are fixedly secured to pin 141 together with member 142 so that any rotary movement experienced by bar pairs 108 is coupled to both pin 141 and bar 142. A substantially L-shaped bar 143 has its first end connected to member 142 and its second end connected to one end of a spring member 110, the opposite end of which is connected to a pin means 144 which is secured to its associated frame bar 113L and 113R respectively in any well known manner. This arrangement provides a cushioning, or shock absorbing function for each drive wheel 109.

A plurality of drill discs 107 are arranged at spaced intervals along the forward end of the mulch apparatus 100, each disc being secured to cross bar 106 by means of C-clamps 102a, each having fastening means 145 for fixedly positioning each of the drill discs 107. The drill discs 107 are provided to produce a bed over the fertilizer being layed as will be more fully described.

A pair of arcuate shaped members 111 are secured at their front ends to frame bars 113L and 113R respectively in any well known manner. Fixedly secured to these bars and extending vertical upward therefrom are a pair of rods 139 which are provided to support fertilizer hopper 103. Hopper 103 is provided at its under surface at a position intermediate its ends with an outlet 103a connecting the hopper 103 with a funnel or feed means 103b for the purpose of depositing fertilizer upon the earth to be mulched. A spreading means, which is only partially shown in FIGURE 1 is comprised of a means (not shown) for feeding the fertilizer from the hopper through the feed means and funnel 103a and 103b respectively and is contained substantially near the bottom of hopper 103. The feed means is controlled by a shaft 140 mounted along the front surface of hopper 103 having a fertilizer drive sprocket 104. Drive sprocket 104 is connected by drive chain 104 to a second drive sprocket (not shown) rotatably mounted to frame bar 113R. This second drive sprocket is connected in any well known manner such as by a second chain means to the right-hand drive wheel 109 for rotation thereof. Thus, it can be seen that upon movement of the mulching device 100 causing rotation of drive wheel 109 this rotation is imparted ultimately to drive chain 105 thereby controlling the fertilizer feeding means (not shown). The fertilizer feed 103b is positioned in front of drill discs 107 so that the drill discs 107 provide a bed over the fertilizer after spreading thereof.

A smoothing board 112 is connected at its front end via members 112a to the curved bars 111 and at its rearward end to the stabilizer bar 114 by means of bars 115. The smoothing board serves to shape the bed formed by the fertilizer and the drilled discs in readiness for the mulch. The smoothing board 112 is designed so as to be adjustable to any desired height and may further be provided with a curved configuration if a bed having a curved contour is desired by the user.

The mulch, or film, is provided in roll form as shown by numeral 117, which roll is mounted upon shaft 136 which is journalled at its ends in substantially U-shaped clamps 148. The film is fed from the roll 117 in such a manner that it is rolled beneath roller 118 which is mounted for rotation upon axle 149. The axle 149 is journalled at its opposite ends to roller brackets 119 which are secured to stabilizer bar 114 in any well known manner. The roller 118 is adjusted so that it places the mulch 160 being rolled beneath roller 118 into contact with the earth beneath so that it acts to both smooth the mulch 160 moving beneath roller 118 and further to control the unrolling of the mulch 160 from the roll 117.

A pair of brackets 116 have their forward ends pivotally mounted to stabilizer bar 114. A spring means 147 has its forward end secured to stabilizer bar 114 and its rearward end secured to the underside of tension brake member 116 at a point intermediate the ends of tension brake member 116. A portion of member 116 towards the rearward end is curved in the manner shown at 116a to substantially conform to the shape of the film roll 117. The underside of the member 116 is coated with a rubberized layer 116b. This arrangement acts to control the rate of feed of the film roll 117 during the mulching operation in order to facilitate the smooth spreading of the mulch and to further prevent the mulch from being fed too rapidly due to the presence of high winds or any other causes. The tension braking means 116 also removes the need for providing any covering means above each clamp 148 thereby facilitating the insertion and removal of plastic rolls 117.

A pair of wheels 124 are mounted to mulching device 100 to the rear of roller 118 and are mounted for rotation upon the lower arms 150a of rods 150 which serve to secure wheels 124 to clamps 102c. The clamps 102c are provided for properly positioning the wheels 124 along their associated frame bars 113L and 113R respectively. Wheels 124 are so positioned in a direction transverse to frame bars 113L and 113R so that they ride upon the opposite edges of the mulch or film 160. This serves to urge the edges of film 160 into the furrows or grooves cut by outer drill discs 107' mounted at the forward end of mulching device 100. A pair of hiller discs 122 are mounted to frame bars 113L and 113R respectively by means of rods 151 and hiller disc clamps 123. The hiller discs 122 serve to redeposit the earth removed by the furrow forming discs 107' upon the edges of mulch 160 acting to secure the mulch along its edges to prevent removal thereof by wind or rain.

A planter wheel 170 is provided for the purpose of performing the activities of mulch piercing and seeding substantially concurrently and is comprised of a wheel 171 mounted for rotation upon a shaft (not shown) which is journalled in the rear ends of mounting bar assembly 135. The mounting bar assembly 135 is provided with apertures 135a at the forward end of the assembly which apertures receive rod 121. The rod 121 is suspended at its ends by means of planter bar suspension brackets 120 each being secured at its upper end to frame bars 113L and 113R respectively and being provided with apertures 120a at its lower end for receiving the associated end of rod 121. The planter assembly 170 is positioned via the suspension means 120 and 121 sufficiently behind roller 118 so that the mulch 160 is adequately spread prior to the performance of the piercing and seeding functions.

Figure 10B:
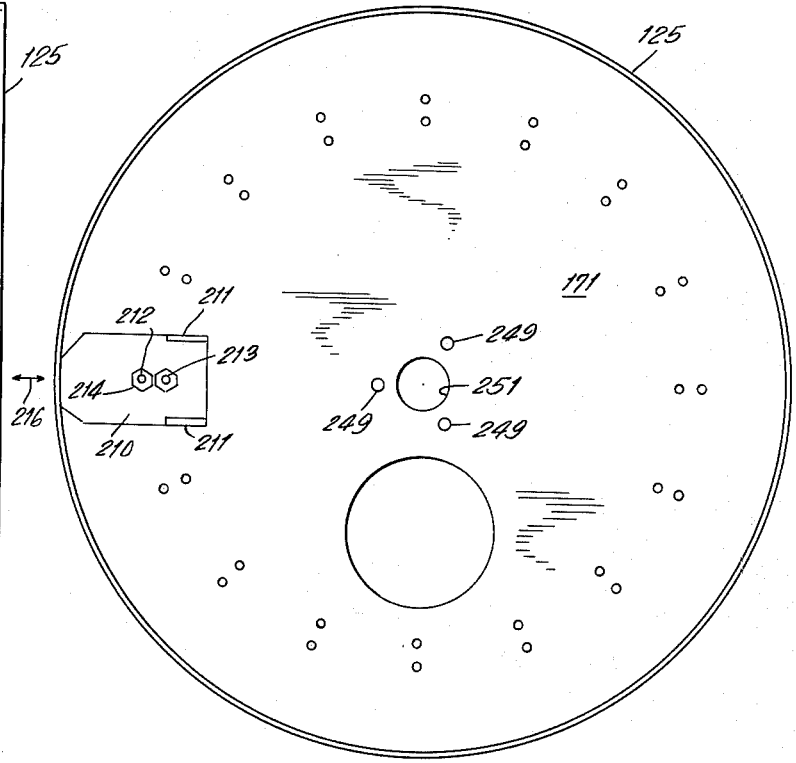

The wheel 171 is a circular disc having secured to its periphery a substantially cylindrical member 125. This can best be seen in FIGURES 10a and 10b. The cylindrical member 125 has a plurality of irregularly shaped openings 126 positioned at predetermined intervals along the surface of cylinder 125. As can be noted in FIGURE 10a the opening 126, only one of which is shown, is substantially rectangular in shape except for a notched portion 126a which is provided for receiving the seed boot assembly in a manner to be more fully described.

A drive wheel sprocket 132 is formed at the end of the planter wheel shaft (not shown) and is employed to control the seed feeding means 180 by means of drive chain 131 in a manner to be more fully described.

The seed feeding means 180 is comprised of a substantially cylindrical seed hopper 134 having a lower curved portion or funnel 134a having its upper end connected to hopper 134 and its lower end connected to the seed feeding housing 174. The seed feeding housing 174 contains a seed metering member (not shown) which is operated by hopper drive sprocket 133 which is driven via drive chain 131 and which acts in a manner to be more fully described, to deposit the proper number of seeds into the seed boot assemblies 127 in readiness for the planting operation.

The seed boot assemblies 127 are mounted so that their lower cutting ends extend through an associated opening 126 and are positioned to cooperate with the seed feeding apparatus 180 to receive the proper quantity of seeds immediately prior to the piercing and seeding operations. A cam means 181 is comprised of suspension bar 130 secured at its upper end to mounting bar 135 and having a lower bar 120 mounted substantially transverse to bar 130. Bar 129 acts as the cam means for sequentially controlling the mulch piercing and seeding activities in a manner to be more fully described.

The seed boot assembly 127 can best be seen in FIGURES 2 and 3. Also, only one such assembly will herein be described. It should be understood that the other assemblies are substantially identical thereto. The seed boot assembly 127 is comprised of a body 190 which is substantialy rectangular in shape. An opening 191 is provided at the upper end and the lower end 193 is curved to form a second opening 194 which forms an acute angle with the upper opening 191. The rear wall 195 of body 190 is provided with an elongated slot 192 which facilitates the mounting to the planter wheel disc 171 (see FIGURE 10b) in a manner to be more fully described. A steel spring 197 having a substantially L-shaped profile is secured at its upper end to the front wall 196 of body 190 in any well known manner and serves to maintain the seed boot assembly in the closed position as will be more fully described. The underside of the curved portion 193 of body 190 is provided with a substantially saw-toothed projection 198 which functions to facilitate the piercing of the mulch being spread in a manner to be more fully described. The side walls 199 of body 190 are each provided with apertures 200 for receiving fastening means such as the fastening means 201 shown in FIGURE 2 for receiving the seed boot cap 202. The seed boot cap 202 is provided with flanges 203 along its opposite ends which are formed so as to be substantially parallel to the side walls 199 of body 190. The steel spring 197 is positioned so that its lower end abuts the inner surface of cap 202 urging cap 202 in the counterclockwise direction about fastening means 201 as shown by arrow 204 in FIGURE 2. This force urges the lower end of cap 202 to engage the edges 205 of the body 190 which define the opening 194 thereby sealing opening 194. The lowermost end of cap 202 beneath the edges 205 is severely tapered and each edge is provided with a saw-toothed configuration. A projection 207 is provided on the outer surface of cap 202 so that it extends transverse to the outer surface. The outer edge of projection 207 is provided with a saw-toothed configuration 208. The saw-toothed profiles 206 and 208 combine with the saw-toothed profile 198 provided on body 190 (see FIGURE 2) to perform the piercing operation upon the mulch or film 160.

Each seed boot assembly 127 is positioned relative to the wheel 171 (see FIGURE 10b) so that the saw-toothed peripheries project through the openings 126. Positioned adjacent each opening 126 and secured to the disc 121 are a plurality of inserts 210. Each insert 210 being provided with a pair of walls 211 extending upwardly from the plane of FIGURE 10b to act as guiding means for the seed boot assembly. A pair of bolts 212 and 213 are secured to the insert 210 and are adapted to be threadedly engaged by the associated nuts 214 and 215 respectively. It can thus be seen that the seed boot assembly is inserted by guiding the assembly between upright walls 211 so that the bolts 212 and 213 extend through the elongated slot 192 provided in the rear wall of the seed boot body 190. In this position the nuts 214 and 215 are then threaded upon their associated bolts 212 and 213 so as to properly position and secure the seed boot assembly 127 to the planter wheel disc 171. It should be noted that the seed boot saw-toothed edges may be projected any desired amount beyond the outer surface of cylindrical member 125 simply by sliding the seed boot assembly 127 in the desired direction as shown by arrow 216. Once the amount of penetration of the seed boot piercing edges is determined nuts 214 and 215 may then be tightened in order to fixedly secure seed boot 127 to disc 171. Each seed boot has a projecting arm 218 fixedly secured at its lower end to the outer surface of seed boot cap 202. The upper end of projecting arm 218 is adapted to be engaged by the cam 129 in a manner to be more fully described in order to rotate cap 202 clockwise about fastening means 201 as shown by arrow 219 in FIGURE 2. This rotary movement acts to unseal or uncover lower opening 194 to permit the dropping of seeds which have been deposited in body 190 to the earth below.

The seed feeding assembly 180 can best be seen in FIGURES 4a–4c, 5a and 5b and is comprised of a substantially cylindrical seed hopper 134 having a tapered or funnel portion 134a at its lower end. The funnel portion 134 is provided with an opening 221 which communicates with an opening 222 in the front wall 223 of seed feeding housing 174. The funnel portion 134 is constructed so as to form a flanged portion 224 surrounding the opening 221 so as to be secured to the front wall 223 of seed feeding housing 174.

The seed feeding housing 174 is comprised of a front wall or plate 223 having a plurality of walls 225–230 extending from the rear surface 223a of housing plate 223 to form an irregularly shaped housing which can best be seen in FIGURE 4b. The lower edge 228a of wall 228 and the curved wall 230 are positioned so that their adjacent edges do not meet thereby forming a break or opening 232 positioned at the lower end of the seed feeding housing 174. A plate 231 having a periphery which is substantially identical to the periphery of the wall formed by members 225–230 is secured to the outer extending edges of the walls 225–230 so as to form a substantially enclosed area. The lower edge 231a of sheet 231 is substantially above the lower curved ends of walls 230 and 228 so as to expose a portion of the seed metering wheel 233. The seed metering wheel 233 is provided with a mulched portion 234 along its periphery which upon rotation thereof is adapted to receive seeds entering through opening 222 and drop these seeds through opening 232 into a seed boot assembly which move beneath opening 232 at the instant that mulch 234 moves into alignment with the opening 232 of seed feeding housing 174.

FIGURE 4c shows the seed metering whel 233 removed from the seed feeding housing 174 for the purposes of clarity. Metering wheel 233 is rotated counterclockwise as shown by arrow 235 by means of drive chain 131 which drives the sprocket 133. The sprocket 133 is shown in detail in FIGURES 9a and 9b and is comprised of a body portion 236 having a tapped aperture 237 for receiving suitable fastening means which is inserted through the central opening 239 in metering wheel 233 (see FIGURE 4b) and which is threadedly engaged by tapped aperture 237 in order to impart the rotary motion experienced by sprocket 133. The body portion 236 is provided with a pin 238 which is seated in aperture 241 in body 236 and which is further seated in an aperture 240 in metering wheel 233. The opposite end of body 236 is flanged outwardly to form the chain sprocket 244 adapted to engage and be driven by chain drive 131.

The driving sprocket 132 shown in detail in FIGURES 6a and 6b and is comprised of a main body portion 245 having two flanged portions 246 and 247 extending therefrom. The flanged portion 246 is provided with apertures 248 adapted to cooperate with apertures 249 in planter wheel disc 171 shown in FIGURE 10b so that upon insertion of the right-hand end 245a of body 245 into the opening 251 of planter wheel disc 170 sprocket assembly 132 may be fastened to planter wheel disc 171 via cooperate apertures 248 and 249. The flanged portion 247 forms the drive wheel sprocket which engages and drives drive chain 131 so as to impart rotation to metering wheel 233.

The seed feeding assembly 180 is positioned in close proximity to the rotatable planting wheel 171 and is secured to the planter wheel mounting bar 135 by means of mounting bracket 252 which is secured to the front wall 233 of seed feeding housing 174 in any well known manner. A plurality of apertures 253 are provided in mounting bracket 254 for cooperating with the apertures 254 in angle bracket 255 shown in FIGURE 12 of the drawings. A second group of apertures 256 are provided in angle bracket 255 for cooperation with the apertures 257 provided in the arm 258 of mounting bar 135 shown in FIGURES 7a and 7b. The arms 258 and 259 of mounting bar 135 are joined at their right-hand ends to form a yoke 260 having an opening 261 for receiving the planter assembly mounting bar 121 shown in FIGURE 1. The opposite ends of arms 258 and 259 are provided with apertures 262 and 263 respectively for receiving an axle member 265 shown in FIGURE 1 which is inserted through apertures 262 and 263 in arms 258–259 respectively of mounting bar 135 and through the central opening 264 provided in drive wheel sprocket 132 as shown in FIGURES 6a and 6b.

The cam means 181 is shown in greater detail in FIGURES 8a and 8b and is comprised of suspended arm 130 which is provided with an aperture 266 at its upper end which cooperates with the left-hand opening 257 in mounting bar arm 258 shown in FIGURES 7a and 7b for the purpose of receiving suitable fastening means. The lower end of suspended arm 130 is provided with apertures 268 through 270 which cooperate with associated apertures 271–273 in cam bar 129 in order to fasten cam bar 129 to suspended arm 130. The fastening means is comprised of three identical fastening assemblies each having a bolt 274 and its first end permanently secured such as by a welding operation to its associated aperture in cam bar 129. Two nuts 275 and 276 are provided on bolt 274 for the purpose of securing cam bar 129 to suspended arm 130 and to further provide an adjustable means for adjusting the distance which cam bar 129 extends from suspended bar 130.

The opposite ends 129a and 129b of cam bar 129 are bent in a direction towards suspended bar 130 so as to provide a smooth opening operation of the seed boot engaged by the cam arm 129 in a manner to be more fully described.

The automatic operation of the mulching device 100 takes place as follows:

The mulching device 100 is pulled along in a direction shown by arrow 160a of FIGURE 1. The movement of the mulching device 100 causes the rotation of drive wheels 109. This rotation controls the movement of the fertilizer and feed means (now shown) causing fertilizer to be spread in the manner previously described upon the row to be mulched and seeded. The inner drill discs 107 plow up the earth of the row to be mulched forming a bed over the fertilizer which has been spread. The outer drill discs 107' generate a furrow, or groove, and simultaneously deposit the earth removed from the furrow along the outside edges of the furrows. That is, in a direction away from the mulching device 100.

The smoothing board 112 acts to smooth the bed formed above the fertilizer and thereby shapes the bed in readiness for the mulch or film. The plastic film is spread along the row and positioned between the two furrows formed by outer drill discs 107' by means of roller 118 which acts to smooth the film and to cause the film to be continuously fed from roll 117. Tension braking means 116 serves to control the rate of feed of the film row 117.

The semi-pneumatic wheels 124 roll along the edges of the film 160 serving to tamp down the film into the furrows formed by the outer drill discs 107'. The hiller discs positioned immediately behind the semi-pneumatic wheels 124 act to redeposit the dirt removed from the furrows formed by discs 107' upon the edges of the mulch serving to prevent lifting of the mulch by wind, rain, or any other source.

The movement of the mulching apparatus 100 causes the planter wheel assembly 170 which makes contact with the row being mulched to rotate clockwise in a direction shown by arrow 275 in FIGURE 1. The rotation of wheel 171 is imparted via drive wheel sprocket 132, drive chain 131 and seed feeding sprocket 132 to the seed metering wheel 233 as shown in FIGURE 4c causing the metering wheel to rotate in a direction shown by arrow 235. When the notched portion 2e of metering wheel 233 is in the position substantially as shown in FIGURE 4c the seeds which are fed via hopper 134 into the region immediately above metering wheel 233 receives a predetermined quantity of seed determined only by the seed dimensions and the dimensions of notch 234.

As the mulching apparatus 100 is moved still further in the direction shown by arrow 160a metering wheel 233 continues its clockwise rotation causing the notch 234 to be moved in the same direction. The seeds contained in the notch 234 are prevented from moving out of notch 234 by means of wall portion 230. However, when notch 234 moves into the position 234 shown in dotted fashion 4c the gap walls 230 and 228 permits the seeds contained in notch 234 to fall downward under the influence of gravity.

At this instant of time the notch 234' is in alignment with the seed boot assembly 127' shown in FIGURE 1 causing the seeds contained in notch 234' to drop into the opening of seed boot assembly 127'. The seed boot assembly 127' is in the sealed position shown in FIGURE 2 thereby preventing the dropping of the seeds deposited in seed boot assembly 127 through the opening 194 shown in FIGURE 3.

As the planter wheel rotates still further in the clockwise direction the seed boot assembly 127' moves to the position occupied by the seed boot assembly 127'' of FIGURE 1. In this position the forward bent edge 129b (see FIGURES 8a and 8b) abuts the upper portion of projecting arm 218 which is affixed to the cap 202 of the seed boot assembly. As the planter wheel moves still further in the clockwise direction the cam member 129 urges the cap 202 in a direction (clockwise about fastening means 201 as shown in FIGURE 2) so as to break the seal of the lower opening 194 of the seed boot assembly.

Immediately prior to this operation and at the time when the seed boot assembly is in the position occupied by assembly 127'' the lower saw-toothed edges of the seed boot assembly make engagement with the film positioned immediately beneath planter wheel 170 causing the film or mulch to be pierced by the saw-toothed edges. As the arm 218 (see FIGURE 2) of the boot assembly engages the cam means 181 this movement is imparted to the saw-toothed edges 206 and 208 causing these edges to move relative to the saw-toothed cutting edge 198. This operation causes a substantially X-shaped slit in the mulch which is widened as the cap 202 moves relative to the boot assembly 190. The X-shaped slit formed by the saw-toothed edges of the boot assemblies is far superior to any other openings such as a circular perforation in that the slit remains substantially closed to prevent the entrance of appreciable amounts of sunlight and any foreign matter. While controlling the amount of water which enters the slit however, when the seeds begin to take nourishment and grow, the X-shaped slit is specifically adapted to yield to the receipt of the shoot thereby permitting unimpeded growth of the shoot.

Immediately after the initial piercing and as the opening 194 becomes uncovered, the seeds contained in the seed boot assembly drop from the seed boot assembly and through the X-shaped slit formed in the mulch on to the earth below. This operation occurs substantially between the positions 127″ and 127‴ shown in FIGURE 1.

As the planter wheel 170 moves still further in the clockwise direction the seed boot assembly occupies the position shown by assembly 127″″. In this position the seed boot extending arm 218 (see FIGURE 2) no longer is engaged by cam bar 129 causing cap 202 to return to the position shown in FIGURE 2 under the influence of spring member 197. This places the seed boot assembly in a position in readiness for the next seed deposit operation in the manner as was previously described.

The number of seed boot assemblies provided around the wheel 125 is dependent strictly upon the needs of the user and if it is desired to plant at specified distances greater than that provided by the wheel 170 shown in FIGURE 1. This may be done simply by removing the appropriate seed boot assembly which will not be needed at the planting operation. It should be understood that the metering wheel 233 must be adapted so as to deposit seeds in the appropriate remaining seed boot assemblies.

Figure 11:
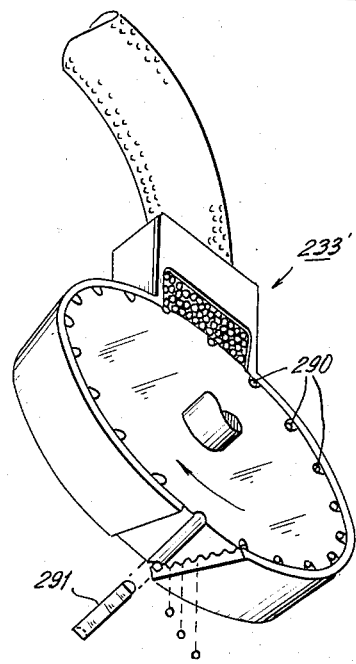
FIGURE 11 shows an alternative embodiment of the seed metering wheel employed in the automatic seed feeding means shown in FIGURES 4a–4c.

A modified metering wheel 233′ is shown in FIGURE 11 and differs from the metering wheel 233 shown in FIGURE 4c in that a plurality of notches 290 are provided around the periphery of wheel 233′. The operation of this wheel however, is identical to that of wheel 233. If it is desired to plant seed at spaced distances greater than the arrangement shown in FIGURE 1 of the drawings, in addition to the removal of the appropriate seed boot assemblies positioned around the planter wheel assembly 170, the metering wheel 233′ of FIGURE 11 is modified simply by inserting the half cylinder slugs 291 in the notches 290 which cooperate with unused seed boot assemblies. The inserts 291 may be secured in the associated notches 290 in any well known manner such as, for example, by providing an adhesive tape which adheres to the surface 292 of the insert 291 and also to the front and rear faces of metering disc 233′.

In addition to the mulching operation as previously described, the mulch apparatus 100 of FIGURE 1 is adapted to receive a suitable insecticide spreading assembly 300, shown diagrammatically, which is mounted to the stabilizer bar 114 by members 301 for the purpose of depositing insecticide or funguid upon the seed bed in order to protect the seed and/or seedlings from soil inhabiting insects and diseases such as cutworms, fruit worms, nematode and plant wilts. A standard hopper with metering device built for metering of granular insecticides or fungicides is used and is operated by a chain drive (not shown) connected to one of the ground driven wheels 109.

The planter assembly support bar 121 is adapted to receive additional seed planting assembly such as the assembly 170 in order to permit the seeding of a plurality of seed rows per bed. In actual practice a mulching device was employed having five such planting wheel assemblies for the purpose of seeding five rows per bed. The actual apparatus employed during the experiment was further adapted to plant at specified distances of 4, 8, 16, 32 and 64 inches between seed deposits.

Also positioned to the mulch laying machine 100 is a suitable packing wheel (not shown) which is provided for the purpose of firming the seed dropped by the seed planting assembly 170 into the soil. The packing wheel used is a standard split, V shaped metal seed packing wheel which attaches by suitable brackets to the planter wheel.

It has been found with crops thus far tested that the packing wheel is not necessary. The plastic has made possible germination of seed which was not covered with soil. The packing wheel might, however, be of value with cotton.

It can therefore be seen that this invention provides an automatic mulching apparatus which has the capability of tilling a row of earth, spreading fertilizer, forming a bed above the fertilizer, laying mulch, securing the mulch to the earth in order to prevent its removal and substantially simultaneously piercing the mulch and planting the desired quantity of seed, all of said functions being performed automatically and at relatively high speeds.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. Apparatus for planting farm products comprising:
   mulching means for laying a film upon the earth;
   boot means;
   wheel type planting means positioned behind said mulching means for piercing the film at spaced intervals;
   said wheel type planting means including means for removably securing at least three boot means to said wheel type planting means for receiving the seeds to be planted, each of said boot means comprising:
   (i) a substantially rectangular body member having a first opening at one end thereof, the other end thereof being curved to form a second opening angularly disposed with respect to said first opening, said body member having a first saw-toothed projection secured at said other end;
   (ii) a cover member pivotally secured to said body member and having a second saw-toothed projection secured at the lower portion thereof and being parallelly disposed to said first saw-toothed projection and a third saw-toothed projection secured to said lower portion and being transverse to said first saw-toothed projection, said cover member being movable between a first position sealing said second opening and a second position exposing said second opening;
   (iii) bias means secured to said body member for biasing said cover member toward its first position;
   said first, second, and third projections cooperating to form a substantially X-shaped piercing instrument when said member is in said first position;
   stationary cam means secured to said wheel type planting means and being positioned to engage a cover member to move said cover member toward said second position during the piercing operation to permit the seeds to drop to the earth through said second opening and the pierced film.

2. The apparatus of claim 1 and further including:
   seed feeding means secured to said wheel type planting means for feeding a predetermined quantity of seed into said boot means first opening at a predetermined time prior to the piercing operation.

3. The apparatus of claim 2 wherein said seed feeding means comprises:
   a hopper;
   a housing;
   and a rotatable metering wheel within said housing and having a plurality of notches along its periphery for receiving seeds from said hopper and transmitting said seeds to the first opening of said boot means.

4. The apparatus of claim 1 wherein said wheel type planting means further includes:
- a circular disc;
- a cylindrical member secured to the periphery of said disc, said cylindrical member having a plurality of openings positioned at predetermined intervals along its surface;
- said boot means being removably secured to said circular disc substantially along radii thereof in alignment with and extending partially through said openings in said cylindrical member;
- whereby rotation of said wheel type planting means causes said boot means to sequentially engage the film beneath said wheel type planting means to pierce said film at spaced intervals.

5. The apparatus of claim 4 and further including seed feeding means rotatable with said disc for feeding a predetermined quantity of seed to said boot means at a predetermined time prior to the piercing operation.

6. The apparatus of claim 5 wherein said seed feeding means comprises:
- a hopper;
- a housing;
- and a rotatable metering wheel within said housing and having a plurality of notches along its periphery in radial alignment with said boot means for receiving seeds from said hopper and transmitting said seeds to said boot means; means removably mounted in said notches for preventing said seed from entering selected notches of said metering wheel, said selected notches corresponding to selectively removed boot means.

References Cited by the Examiner

UNITED STATES PATENTS

| | | | |
|---|---|---|---|
| 311,382 | 1/85 | Sheldon | 111—91 |
| 1,218,919 | 3/17 | Youngren et al. | 111—91 |
| 1,372,997 | 3/21 | Eckart | 47—9 |
| 1,396,269 | 11/21 | Eckart | 47—9 |
| 1,882,377 | 10/32 | Whittelsey | 47—9 |
| 2,626,578 | 1/53 | Morine | 111—3 |
| 2,890,665 | 6/59 | Kang | 111—3 |
| 2,961,979 | 11/60 | Stanley | 111—3 |
| 3,048,132 | 8/62 | Morgan et al. | 111—77 |
| 3,103,186 | 9/63 | Saifuku | 111—2 |

ABRAHAM G. STONE, *Primary Examiner.*

A. JOSEPH GOLDBERG, WILLIAM A. SMITH III, *Examiners.*